United States Patent
Jo

(10) Patent No.: US 12,253,864 B2
(45) Date of Patent: Mar. 18, 2025

(54) APPARATUS FOR CONTROLLING DRIVING OF MOVING OBJECT AND METHOD THEREOF

(71) Applicants: HYUNDAI MOTOR COMPANY, Seoul (KR); KIA CORPORATION, Seoul (KR); MOBINN INC., Suwon-si (KR)

(72) Inventor: Sun Myoung Jo, Ansan-si (KR)

(73) Assignees: HYUNDAI MOTOR COMPANY, Seoul (KR); KIA CORPORATION, Seoul (KR); MOBINN INC., Suwon-si (KR)

( * ) Notice: Subject to any disclaimer, the term of this patent is extended or adjusted under 35 U.S.C. 154(b) by 200 days.

(21) Appl. No.: 17/968,574

(22) Filed: Oct. 18, 2022

(65) Prior Publication Data

US 2023/0409036 A1     Dec. 21, 2023

(30) Foreign Application Priority Data

Jun. 15, 2022 (KR) .......... 10-2022-0073078

(51) Int. Cl.
| | |
|---|---|
| G05D 1/435 | (2024.01) |
| B25J 5/00 | (2006.01) |
| B25J 9/16 | (2006.01) |
| B25J 19/02 | (2006.01) |
| G05D 1/245 | (2024.01) |
| G05D 109/15 | (2024.01) |
| G05D 111/50 | (2024.01) |

(52) U.S. Cl.
CPC .............. *G05D 1/435* (2024.01); *B25J 5/007* (2013.01); *B25J 9/1664* (2013.01); *B25J 19/02* (2013.01); *G05D 1/245* (2024.01); *G05D 2109/15* (2024.01); *G05D 2111/52* (2024.01)

(58) Field of Classification Search
CPC ........ B25J 5/007; B25J 9/1664; B25J 13/089; B25J 19/02; G05D 1/245; G05D 1/435; G05D 2109/15; G05D 2111/52
See application file for complete search history.

(56) References Cited

U.S. PATENT DOCUMENTS

| | | | |
|---|---|---|---|
| 5,123,495 A * | 6/1992 | Littlejohn ................. | B66B 9/08 180/907 |
| 2015/0105940 A1 | 4/2015 | Takase | |
| 2018/0177652 A1* | 6/2018 | Furman ................ | A61G 7/1073 |
| 2020/0368629 A1* | 11/2020 | Moss ..................... | A63H 17/21 |
| 2021/0008723 A1 | 1/2021 | Choi et al. | |

(Continued)

FOREIGN PATENT DOCUMENTS

| | | |
|---|---|---|
| JP | 2007-219986 A | 8/2007 |
| JP | 2021-026469 A | 2/2021 |
| KR | 10-1159043 B1 | 6/2012 |

(Continued)

*Primary Examiner* — Dale Moyer
(74) *Attorney, Agent, or Firm* — MCDONNELL BOEHNEN HULBERT & BERGHOFF LLP

(57) ABSTRACT

An apparatus and method for controlling driving of a moving object that climbs up or down stairs comprises a tilt sensor configured to sense a slope of the moving object in a pitch direction, and a processor configured to reduce a speed of the moving object in a specific section while the moving object climbs up or down the stairs, based on the sensed slope.

16 Claims, 10 Drawing Sheets

(56) References Cited

U.S. PATENT DOCUMENTS

2022/0274636 A1 9/2022 Kinoshita et al.
2023/0047500 A1* 2/2023 Lafontaine ............. B62D 51/04

FOREIGN PATENT DOCUMENTS

| KR | 2017-0083854 A | 7/2017 |
| KR | 2019-0130214 A | 11/2019 |
| WO | 2020/209394 A1 | 10/2020 |

* cited by examiner

APPARATUS FOR CONTROLLING DRIVING OF MOVING OBJECT AND METHOD THEREOF

CROSS REFERENCE TO RELATED APPLICATIONS

This application claims the benefit of priority to Korean Patent Application No. 10-2022-0073078, filed in the Korean Intellectual Property Office on Jun. 15, 2022, the entire contents of which are incorporated herein by reference.

TECHNICAL FIELD

The present disclosure relates to an apparatus for controlling driving of a moving object and a method thereof, and more particularly, relates to an apparatus and method for controlling driving of a moving object climbing up or down stairs.

BACKGROUND

A technology for allowing a moving object, such as an autonomous robot, to travel on an obstacle, such as stairs, by itself is being developed. In particular, when the angle of the moving object is changed in the process in which the moving object travels on the obstacle, a pulling phenomenon and a rolling phenomenon occur due to the gravity and inertia, and therefore an unstable driving situation is induced. In the related art, to control movement stability in the process in which the moving object travels on the obstacle, advanced modern and predictive control techniques, such as an observer control system and model predictive control (MPC), are used inside a controller.

However, according to the related art, complex control techniques, such as modern and predictive control, have to be used for real-time control corresponding to a control technique within about 5 ms for stable travel of the moving object on the obstacle. Therefore, excessive computational resources depending on complex computation may be required, and application may be limited. Accordingly, it is necessary to develop a technology for solving these problems.

SUMMARY

The present disclosure has been made to solve the above-mentioned problems occurring in the prior art while advantages achieved by the prior art are maintained intact.

An aspect of the present disclosure provides an apparatus and method for controlling driving of a moving object climbing up or down stairs.

Another aspect of the present disclosure provides a moving-object driving control apparatus and method for improving driving safety of a moving object climbing up or down stairs.

Another aspect of the present disclosure provides a moving-object driving control apparatus and method for enabling a moving object to overcome an atypical obstacle by using a simple algorithm without using an excessive computational resource.

Another aspect of the present disclosure provides a moving-object driving control apparatus and method for applying an individually customized algorithm for driving stability depending on the shape of a stair on which a moving object travels at present in a process of climbing up stairs.

Another aspect of the present disclosure provides a moving-object driving control apparatus and method for minimizing a reduction in driving stability and moving speed of a moving object and improving autonomous driving stability of the moving object.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling driving of a moving object includes a tilt sensor that is included in the moving object and that senses a slope of the moving object in a pitch direction and a processor that reduces a speed of the moving object in a specific section while the moving object climbs up or down stairs, based on the sensed slope.

In an embodiment, the processor may determine whether the moving object climbs up the stairs, based on the sensed slope.

In an embodiment, the processor may determine a maximum slope in a section in which the moving object climbs up the stairs, based on the sensed slope.

In an embodiment, the processor may determine a slope at a point at which a continuous increase in the sensed slope ends, as the maximum slope.

In an embodiment, the processor may determine that the continuous increase in the sensed slope ends, when a slope sensed in a current cycle minus a slope sensed in a previous cycle is not greater than a preset threshold value.

In an embodiment, the processor may determine whether the sensed slope is greater than the maximum slope minus a specific margin and may reduce the speed of the moving object in a section in which the sensed slope is greater than the maximum slope minus the specific margin.

In an embodiment, the processor may determine whether the sensed slope is greater than a preset threshold slope and may reduce the speed of the moving object in a section in which the sensed slope is greater than the preset threshold slope.

In an embodiment, the processor may update the maximum slope when the sensed slope is greater than the maximum slope while the moving object climbs up the stairs.

In an embodiment, the processor may determine whether the moving object climbs down the stairs, based on the slope and may reduce the speed of the moving object when it is determined that the moving object climbs down the stairs.

In an embodiment, the processor may consistently determine whether the moving object has finished climbing down the stairs, based on the slope when it is determined that the moving object climbs down the stairs, and may increase the speed of the moving object to an existing speed when it is determined that the moving object has finished climbing down the stairs.

According to another aspect of the present disclosure, a method for controlling driving of a moving object comprises a step of sensing, by a tilt sensor included in the moving object, a slope of the moving object in a pitch direction and a step of reducing, by a processor, a speed of the moving object in a specific section while the moving object climbs up or down stairs, based on the sensed slope.

In an embodiment, the step of reducing, by the processor, the speed of the moving object in the specific section while the moving object climbs up or down the stairs, based on the sensed slope may comprise a step of determining, by the processor, whether the moving object climbs up the stairs, based on the sensed slope.

In an embodiment, the step of reducing, by the processor, the speed of the moving object in the specific section while the moving object climbs up or down the stairs, based on the sensed slope may comprise a step of determining, by the processor, a maximum slope in a section in which the moving object climbs up the stairs, based on the sensed slope.

In an embodiment, the step of determining, by the processor, the maximum slope in the section in which the moving object climbs up the stairs, based on the sensed slope may comprise a step of determining, by the processor, a slope at a point at which a continuous increase in the sensed slope ends, as the maximum slope.

In an embodiment, the step of determining, by the processor, the slope at the point at which the continuous increase in the sensed slope ends, as the maximum slope may comprise a step of determining that the continuous increase in the sensed slope ends, when a slope sensed in a current cycle minus a slope sensed in a previous cycle is not greater than a preset threshold value.

In an embodiment, the step of reducing, by the processor, the speed of the moving object in the specific section while the moving object climbs up or down the stairs, based on the sensed slope may further comprise a step of determining, by the processor, whether the sensed slope is greater than the maximum slope minus a specific margin and a step of reducing, by the processor, the speed of the moving object in a section in which the sensed slope is greater than the maximum slope minus the specific margin.

In an embodiment, the step of reducing, by the processor, the speed of the moving object in the specific section while the moving object climbs up or down the stairs, based on the sensed slope may comprise a step of determining, by the processor, whether the sensed slope is greater than a preset threshold slope and a step of reducing, by the processor, the speed of the moving object in a section in which the sensed slope is greater than the preset threshold slope.

In an embodiment, the step of reducing, by the processor, the speed of the moving object in the specific section while the moving object climbs up or down the stairs, based on the sensed slope may further comprise a step of updating, by the processor, the maximum slope when the sensed slope is greater than the maximum slope while the moving object climbs up the stairs.

In an embodiment, the step of reducing, by the processor, the speed of the moving object in the specific section while the moving object climbs up or down the stairs, based on the sensed slope may comprise a step of determining, by the processor, whether the moving object climbs down the stairs, based on the slope and a step of reducing, by the processor, the speed of the moving object when it is determined that the moving object climbs down the stairs.

In an embodiment, the step of reducing, by the processor, the speed of the moving object in the specific section while the moving object climbs up or down the stairs, based on the sensed slope may further comprise a step of consistently determining, by the processor, whether the moving object has finished climbing down the stairs, based on the slope when it is determined that the moving object climbs down the stairs and a step of increasing, by the processor, the speed of the moving object to an existing speed when it is determined that the moving object has finished climbing down the stairs.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
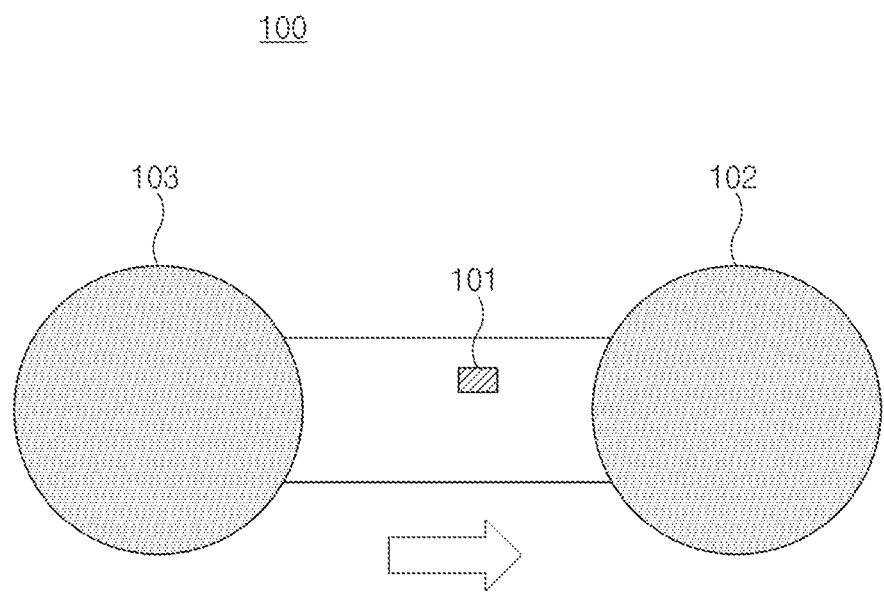
FIG. 1 is a view illustrating a moving object including a moving-object driving control apparatus according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 7.

FIG. 1 is a view illustrating a moving object including a moving-object driving control apparatus according to an embodiment of the present disclosure.

Referring to FIG. 1, the moving object 100 may include a tilt sensor 101, a front wheel 102, and a rear wheel 103.

For example, the moving object 100 may include one or more front wheels 102 and one or more rear wheels 103.

For example, the front wheel 102 and the rear wheels 103 of the moving object 100 may be formed of an elastic material to climb up stairs.

When the front wheel 102 and the rear wheel 103 of the moving object 100 are formed of an elastic material, the radial distances from the central axes of the front wheel 102 and the rear wheel 103 to the stairs with which the front wheel 102 and the rear wheel 103 make contact may be decreased, and thus the moving object 100 may travel on the stairs with less torque.

The tilt sensor 101 may sense an angle at which the moving object 100 is inclined in the front-rear direction with respect to an axis parallel to the axis of the front wheel 102 and the axis of the rear wheel 103.

For example, the tilt sensor 101 may be implemented with various sensors, such as a G sensor, a gyro sensor, and/or an acceleration sensor, and may sense the slope of the moving object 100 in a pitch direction.

In particular, the tilt sensor 101 may sense the slope of the moving object 100 in the pitch direction in the process in which the moving object 100 climbs up or down the stairs.

Figure 2:
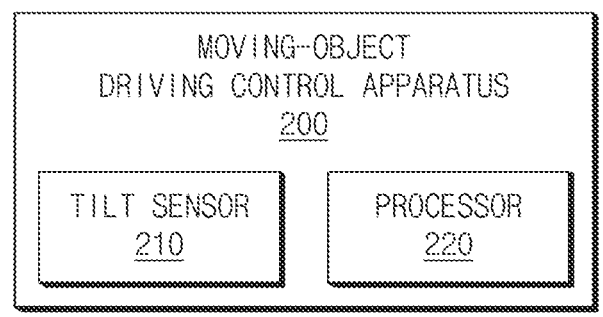
FIG. 2 is a block diagram illustrating the moving-object driving control apparatus according to an embodiment of the present disclosure.

FIG. 2 is a block diagram illustrating the moving-object driving control apparatus according to an embodiment of the present disclosure.

The moving-object driving control apparatus 200 according to the present disclosure may be implemented inside or outside the moving object. In this case, the moving-object driving control apparatus 200 may be integrally formed with control units inside the moving object, or may be implemented with a separate hardware device and may be connected with the control units of the moving object by connecting means.

For example, the moving-object driving control apparatus 200 may be integrated with the moving object, may be implemented in a form in which the moving-object driving control apparatus 200 is installed on/attached to the moving object as a component separate from the moving object, or may be implemented in a form in which a part is integrated with the moving object and another part is installed on/attached to the moving object as a component separate from the moving object.

Referring to FIG. 2, the moving-object driving control apparatus 200 may include a tilt sensor 210 and a processor 220.

The tilt sensor 210 may be included in the moving object and may sense the slope of the moving object in the pitch direction.

The moving object may include an autonomous robot that includes one or more front wheels and one or more rear wheels.

The slope of the moving object in the pitch direction may refer to the direction in which the moving object rotates with respect to a horizontal direction (the y-axis direction) of the moving object.

For example, the slope in the pitch direction may be sensed such that the direction in which a front part of the moving object rotates upward has a positive slope.

For example, the tilt sensor 210 may include various sensors, such as a G sensor, a gyro sensor, and/or an acceleration sensor.

For example, the tilt sensor 210 may be connected with wires, or wirelessly connected with the processor 220, and may directly or indirectly transfer information about the sensed slope to the processor 220.

Although not illustrated, the moving-object driving control apparatus 200 may further include a memory connected to the processor 220.

The processor 220 may perform data processing and/or computation that will be described below. Furthermore, the memory (such as memory 1300 shown in FIG. 7)) may store data or an algorithm required in the process in which the processor 220 performs the data processing and/or the computation.

The memory 1300 may store instructions executed by the processor 220.

The processor 220 may be an electrical circuit that executes commands of software. For example, the processor 220 may be an electronic control unit (ECU), a micro controller unit (MCU), or another low-level controller.

The memory 1300 may include at least one type of storage medium among memories of a flash memory type, a hard disk type, a micro type, and a card type (e.g., a Secure Digital (SD) card or an eXtream Digital (XD) card) and memories of a Random Access Memory (RAM) type, a Static RAM (SRAM) type, a Read-Only Memory (ROM) type, a Programmable ROM (PROM) type, an Electrically Erasable PROM (EEPROM) type, a Magnetic RAM (MRAM) type, a magnetic disk type, and an optical disk type.

The processor 220 may perform overall control to enable components to normally perform functions thereof. The processor 220 may be implemented in the form of hardware or software, or in a combination thereof. The processor 220 may be preferably implemented with a microprocessor, but is not limited thereto. Furthermore, the processor 220 may perform various data processing or computation that will be described below.

The processor 220 may control acceleration/deceleration and steering of the moving object during driving or autonomous driving of the moving object.

Based on the sensed slope, the processor 220 may reduce the speed of the moving object in a specific section while the moving object climbs up or down stairs.

For example, to improve driving stability by decreasing vibration caused by rolling and/or pulling while the moving object climbs up or down the stairs, the processor 220 may control autonomous driving of the moving object by reducing the speed of the moving object in a specific section determined based on the sensed slope.

For example, based on the sensed slope, the processor 220 may determine whether the moving object climbs up the stairs.

Specifically, when the sensed slope exceeds a first reference value, the processor 220 may determine that the moving object climbs up the stairs.

For example, the first reference value may be set to 10 degrees.

For example, based on consistently sensed slope data, the processor 220 may determine a maximum slope in a section in which the moving object climbs up the stairs.

For example, the moving object may travel on stairs having different shapes depending on travel paths of the moving object, and therefore the processor 220 may determine a maximum slope corresponding to each of the stairs to improve driving stability by controlling the speed of the moving object while the moving object travels on each of the stairs.

The heights and widths of steps included in the stairs are generally constant or have a slight error range. Therefore, in the process in which the moving object travels on the stairs, the slope of the moving object may be periodically changed depending on the period in which the moving object climbs up the steps, and it is required to determine the maximum slope corresponding to the stairs.

For example, the processor 220 may determine a slope at a point at which a continuous increase in the slope sensed while the moving object climbs up the stairs ends, as the maximum slope.

For example, the processor 220 may sense the slope of the moving object through the tilt sensor 210 depending on a preset period or cycle.

The period or cycle may be set based on time. The period or cycle may be set depending on the time during which a loop included in an algorithm is calculated in consideration of the operation speed of the processor 220 and may be changed in real time.

For example, when a slope sensed in the current cycle minus a slope sensed in the previous cycle is not greater than a preset threshold value, the processor 220 may determine that the continuous increase in the sensed slope ends.

In this case, when the slope sensed in the current cycle minus the slope sensed in the previous cycle is not greater than the preset threshold value, the processor 220 may determine the slope sensed in the current cycle or the slope sensed in the previous cycle as the maximum slope.

For example, when the slope sensed while the moving object climbs up the stairs is greater than the maximum slope, the processor 220 may update the maximum slope.

For example, the processor 220 may determine whether the sensed slope is greater than the maximum slope minus a specific margin and may reduce the speed of the moving object in the section in which the sensed slope is greater than the maximum slope minus the specific margin.

That is, by reducing the speed of the moving object in advance before the slope of the moving object reaches the maximum slope, the processor 220 may decrease driving instability due to vibration of the moving object that occurs at the instant when the slope of the moving object starts to decrease after reaching the maximum slope.

For example, in the section in which the sensed slope is greater than the maximum slope minus the specific margin, the processor 220 may determine that vibration of the moving object causing driving instability of the moving object is imminent and may reduce the driving speed in advance.

For example, the processor 220 may determine whether the sensed slope is greater than a preset threshold slope and may reduce the speed of the moving object in the section in which the sensed slope is greater than the preset threshold slope.

Here, the threshold slope may be a preset value in design.

In the process in which the moving object travels on the stairs, driving instability may occur due to a steep slope irrespective of the maximum slope in the section in which the sensed slope is greater than the preset threshold slope, and therefore the processor 220 may reduce the speed of the moving object in the section in which the sensed slope is greater than the preset threshold slope.

For example, the processor 220 may determine whether the moving object climbs down the stairs, based on the sensed slope and may reduce the speed of the moving object when it is determined that the moving object climbs down the stairs.

Specifically, when the sensed slope is smaller than a second reference value having a negative value, the processor 220 may determine that the moving object climbs down the stairs.

For example, the second reference value may be set to −10 degrees.

For example, the processor 220 may consistently determine whether the moving object has finished climbing down the stairs, based on the slope when it is determined that the moving object climbs down the stairs, and may increase the speed of the moving object to an existing speed when it is determined that the moving object has finished climbing down the stairs.

Unlike when the moving object climbs up the stairs, when the moving object climbs down the stairs, there is no intermediate process for climbing up the stairs, and therefore it may be impossible to predict a maximum slope or a minimum slope. Accordingly, when the moving object climbs down the stairs, the processor 220 may control driving of the moving object by reducing the speed of the moving object until the slope of the moving object approaches a slope corresponding to a flat land.

Figure 3A:
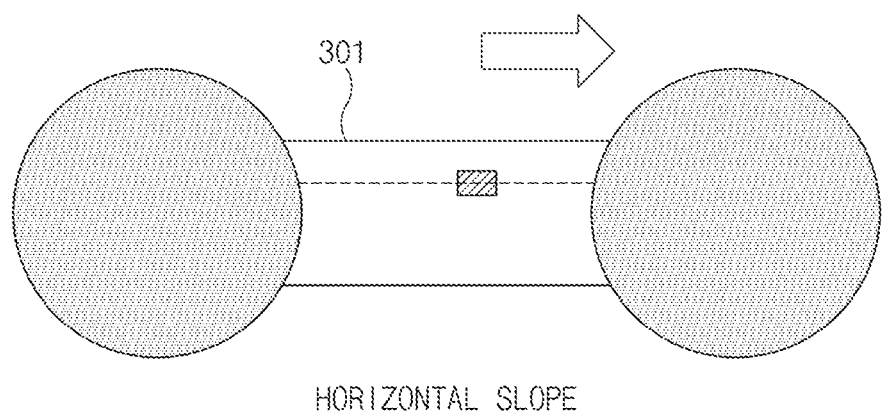
FIGS. 3A, 3B, and 3C are views illustrating detection of the slopes of moving objects by the moving-object driving control apparatus according to an embodiment of the present disclosure.
Figure 3B:
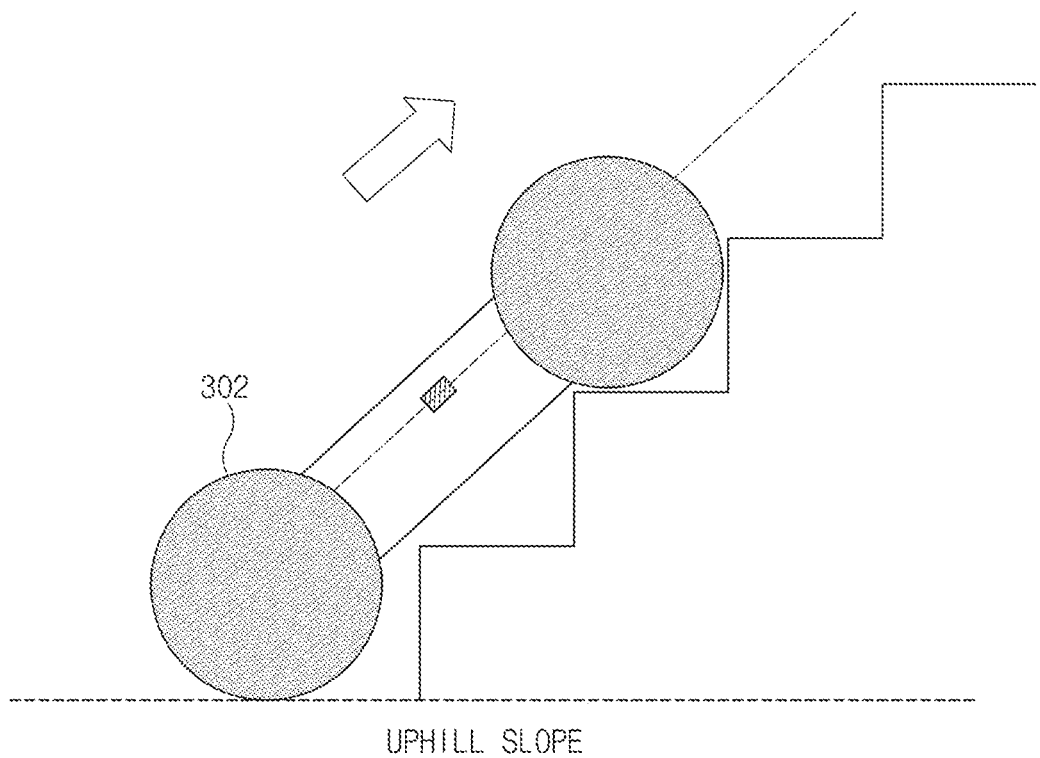
Figure 3C:
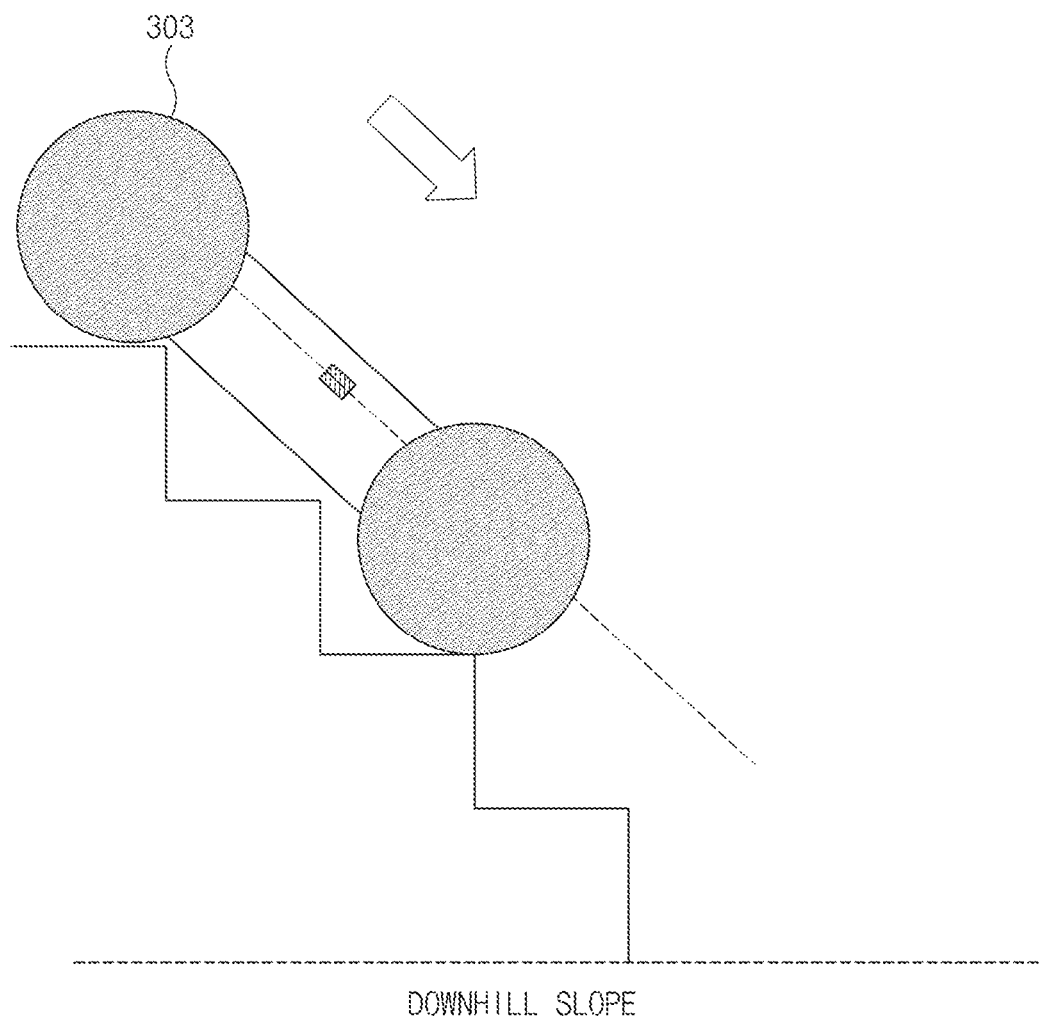

FIGS. 3A to 3C are views illustrating detection of the slopes of moving objects by the moving-object driving control apparatus according to an embodiment of the present disclosure.

Referring to FIG. 3A, the moving-object driving control apparatus may determine that the slope of a moving object 301 in a pitch direction is a horizontal slope corresponding to a situation in which the moving object 301 travels on a flat land.

For example, the moving-object driving control apparatus may sense the slope of the moving object 301 in the pitch direction through the tilt sensor, and when the sensed slope is included in a horizontal slope range, the moving-object driving control apparatus may determine that the moving object 301 travels on a flat land.

For example, the horizontal slope range may refer to the range between −10 degrees and 10 degrees.

Referring to FIG. 3B, the moving-object driving control apparatus may determine that the slope of a moving object 302 in a pitch direction is a slope corresponding to a situation in which the moving object 302 climbs up stairs.

For example, the moving-object driving control apparatus may sense the slope of the moving object 302 in the pitch direction through the tilt sensor, and when the sensed slope is included in a slope range corresponding to the situation in which the moving object 302 climbs up the stairs, the moving-object driving control apparatus may determine that the moving object 302 climbs up the stairs.

For example, the slope range corresponding to the situation in which the moving object 302 climbs up the stairs may refer to an angle range of more than 10 degrees.

Referring to FIG. 3C, the moving-object driving control apparatus may determine that the slope of a moving object 303 in a pitch direction is a slope corresponding to a situation in which the moving object 303 climbs down stairs.

For example, the moving-object driving control apparatus may sense the slope of the moving object 303 in the pitch direction through the tilt sensor, and when the sensed slope is included in a slope range corresponding to the situation in which the moving object 303 climbs down the stairs, the moving-object driving control apparatus may determine that the moving object 303 climbs down the stairs.

For example, the slope range corresponding to the situation in which the moving object 303 climbs down the stairs may refer to an angle range of less than −10 degrees.

Figure 4A:
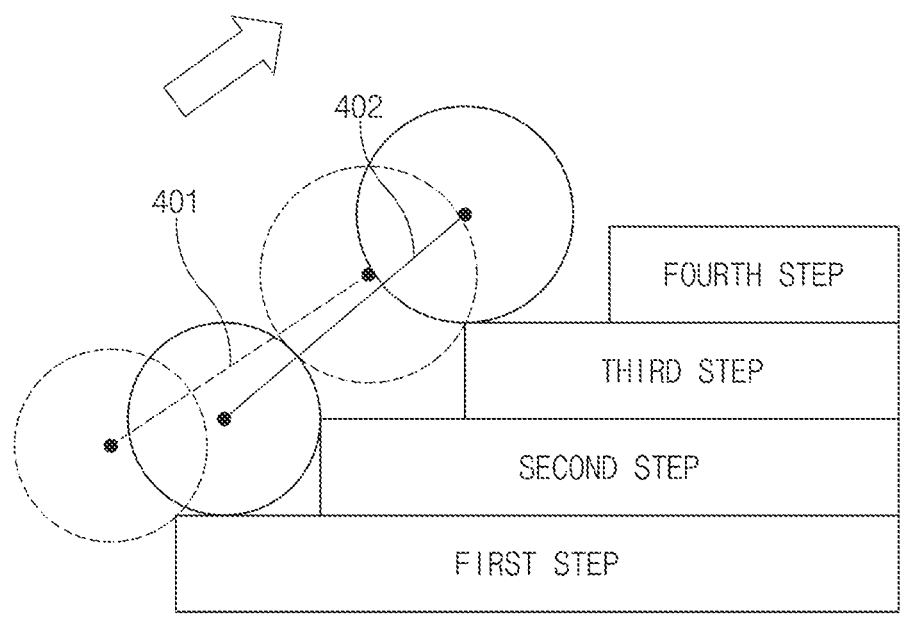
FIGS. 4A and 4B are views illustrating a situation in which the moving object including the moving-object driving control apparatus climbs up stairs according to an embodiment of the present disclosure.
Figure 4B:
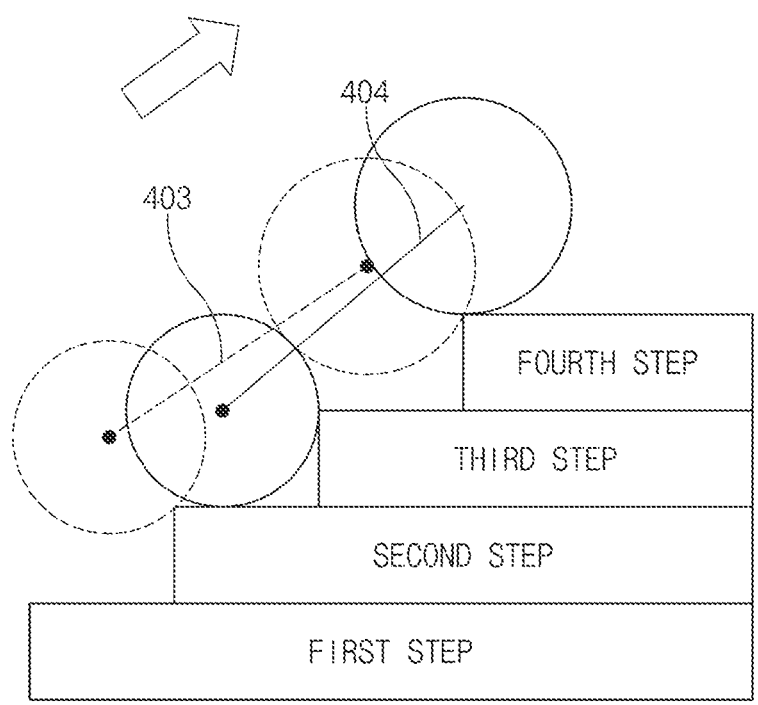

FIGS. 4A and 4B are views illustrating a situation in which the moving object including the moving-object driving control apparatus climbs up stairs according to an embodiment of the present disclosure.

Referring to FIGS. 4A and 4B, in the process in which the moving object climbs up the stairs, the moving-object driving control apparatus may sense slopes corresponding to 401 to 404 in sequence through the tilt sensor.

For example, in the process in which the moving object climbs up the stairs, the slope of the moving object may be continuously increased while being changed from the slop corresponding to 401 to the slope corresponding to 402.

For example, in the process in which the moving object climbs up the stairs, the slope of the moving object may be continuously decreased while being changed from the slop corresponding to 402 to the slope corresponding to 403.

For example, in the process in which the moving object climbs up the stairs, the slope of the moving object may be continuously increased while being changed from the slop corresponding to 403 to the slope corresponding to 404.

In the process in which the slope of the moving object is changed from the slope corresponding to 402 to the slope corresponding to 403, vibration or rolling may occur due to the center of gravity biased to the front side for the uphill driving of the moving object on the stairs, and therefore driving instability may be caused.

To solve the driving instability, the moving-object driving control apparatus may store the maximum slope of the moving object in the process in which the slope of the moving object is changed from the slope corresponding to 401 to the slope corresponding to 402. For example, the slope corresponding to 402 may be the maximum slope.

When the slope of the moving object approaches the maximum slope, the moving-object driving control apparatus may temporarily vary the speed of the moving object to prevent excessive vibration or rolling.

Furthermore, the moving-object driving control apparatus may temporarily vary (reduce) the speed of the moving object only when the slope of the moving object approaches the maximum slope and may increase the speed of the moving object to the existing speed when the slope of the moving object is far away from the maximum slope. Accordingly, the moving-object driving control apparatus may minimize an increase in travel time on the climbing path.

Figure 5:
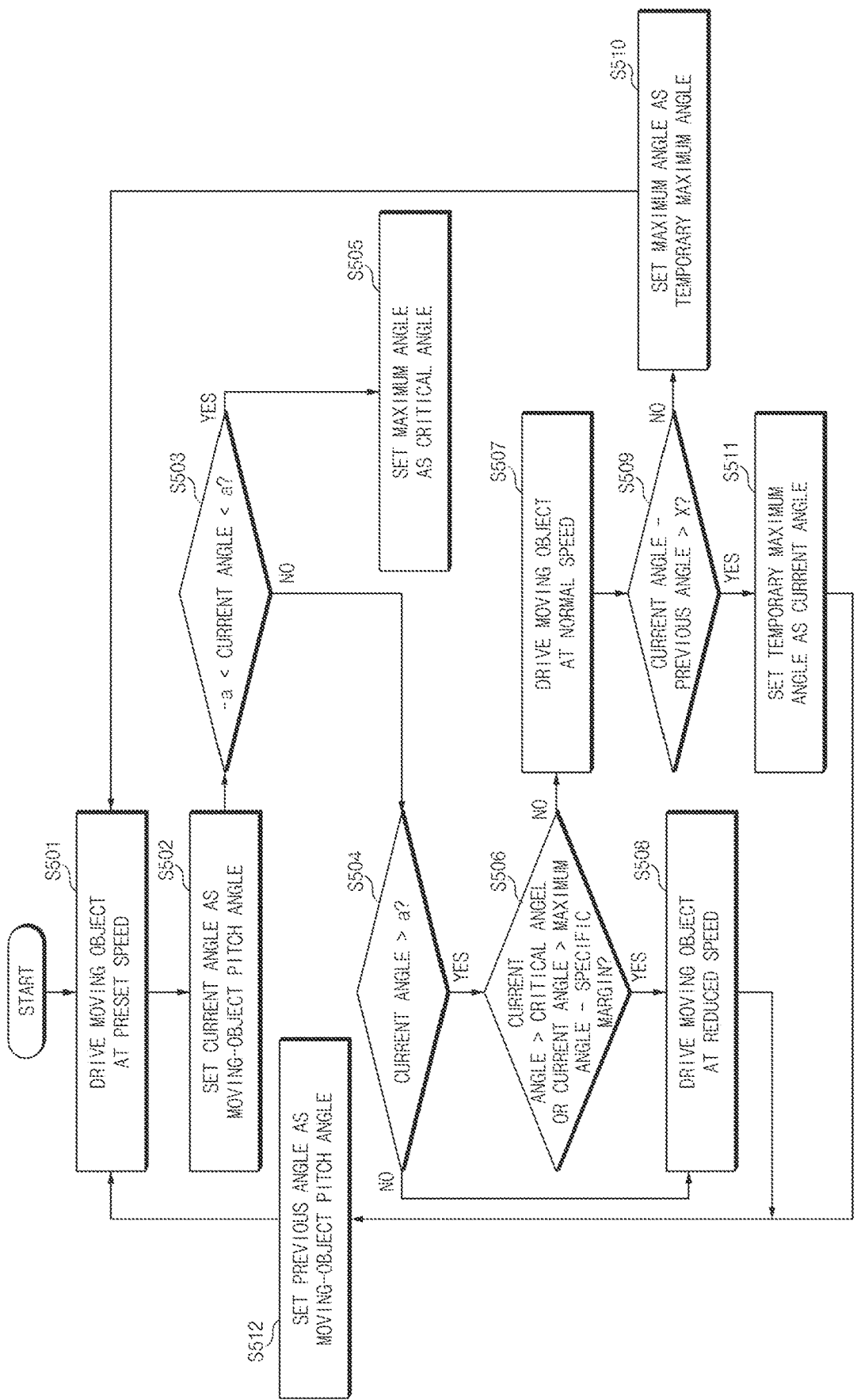
FIG. 5 is a flowchart illustrating an operation of the moving-object driving control apparatus according to an embodiment of the present disclosure.

FIG. 5 is a flowchart illustrating an operation of the moving-object driving control apparatus according to an embodiment of the present disclosure.

Referring to FIG. 5, the moving-object driving control apparatus may control driving of the moving object such that the moving object travels at a preset speed at S501.

Here, the preset speed may refer to a normal driving speed.

The moving-object driving control apparatus may set the current angle as a moving-object pitch angle at S502.

Here, the current angle may be understood as a pitch angle of the moving object that corresponds to the current cycle (or loop).

The moving-object driving control apparatus may determine whether the current angle is between "−a" and "+a" at S503.

Here, "a" may be a reference value for a determination as to whether the moving object travels on a flat land at present. For example, "a" may be set to 10 degrees.

For example, when the current angle is between "−a" and "+a", the moving-object driving control apparatus may determine that the moving object travels on the flat land.

When it is determined that the current angle is between "−a" and "+a", the moving-object driving control apparatus may set a maximum angle as a critical angle at S505.

Here, the critical angle may be an angle set in design.

When it is determined that the current angle is not between "−a" and "+a", the moving-object driving control apparatus may determine whether the current angle is greater than "+a" at S504.

When it is determined that the current angle is not greater than "+a", the moving-object driving control apparatus may control the moving object to travel at a reduced speed at S508.

Here, when the current angle is not greater than "+a", the current angle is smaller than "−a", and therefore the moving-object driving control apparatus may determine that the moving object climbs down stairs.

For example, when the current angle is greater than "+a", the moving-object driving control apparatus may determine that the moving object climbs up the stairs.

When it is determined that the current angle is greater than "+a", the moving-object driving control apparatus may determine whether the current angle is greater than the critical angle or whether the current angle is greater than the maximum angle minus a specific margin at S506.

For example, when the current angle is greater than the critical angle or the current angle is greater than the maximum angle minus the specific margin, the moving-object driving control apparatus may determine that unstable driving (sudden vibration or rolling) of the moving object is expected.

When it is determined that the current angle is greater than the critical angle or the current angle is greater than the maximum angle minus the specific margin, the moving-object driving control apparatus may control the moving object to travel at the reduced speed at S508.

When it is determined that the current angle is not greater than the critical angle or the current angle is not greater than the maximum angle minus the specific margin, the moving-object driving control apparatus may control the moving object to travel at a normal speed at S507.

The moving-object driving control apparatus may determine whether the current angle minus the previous angle is greater than "x" at S509.

For example, to determine whether the current angle is increasing, the moving-object driving control apparatus may determine whether the current angle minus the previous angle is greater than "x".

Here, the previous angle may be understood as a pitch angle of the moving object that corresponds to the previous cycle (or loop).

When it is determined that the current angle minus the previous angle is greater than "x", the moving-object driving control apparatus may set a temporary maximum angle as the current angle at S511.

In this case, the moving-object driving control apparatus may determine that the current angle is increasing.

When it is determined that the current angle minus the previous angle is not greater than "x", the moving-object driving control apparatus may set the maximum angle as a temporary maximum angle at S510.

In this case, the moving-object driving control apparatus may determine that the current angle is not increasing.

The moving-object driving control apparatus may set the previous angle as a moving-object pitch angle at S512.

Figure 6:
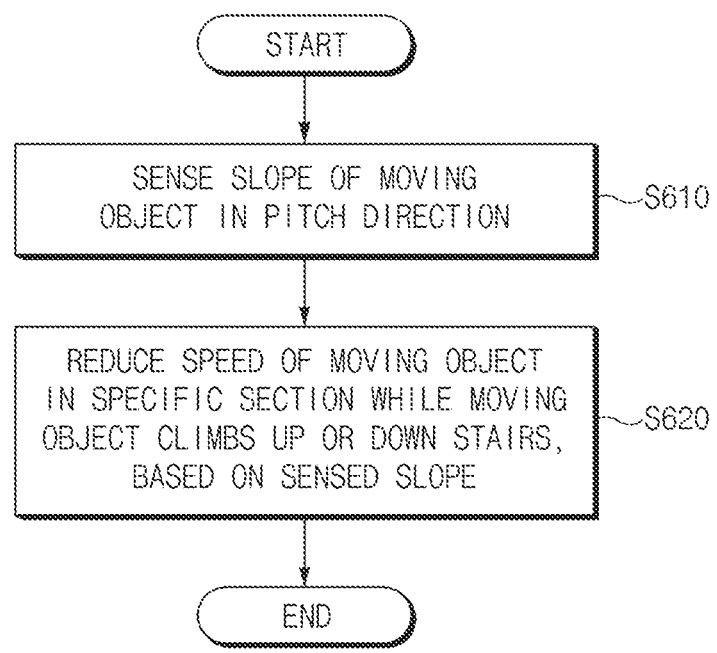
FIG. 6 is a flowchart illustrating a moving-object driving control method according to an embodiment of the present disclosure.

FIG. 6 is a flowchart illustrating a moving-object driving control method according to an embodiment of the present disclosure.

Referring to FIG. 6, the moving-object driving control method may include step S610 of sensing the slope of a moving object in a pitch direction and step S620 of reducing the speed of the moving object in a specific section while the moving object climbs up or down stairs, based on the sensed slope.

Step S610 of sensing the slope of the moving object in the pitch direction may be performed by a tilt sensor included in the moving object.

Step S620 of reducing the speed of the moving object in the specific section while the moving object climbs up or down the stairs, based on the sensed slope may be performed by a processor.

For example, step S620 of reducing the speed of the moving object in the specific section while the moving object climbs up or down the stairs, based on the sensed slope may include a step of determining, by the processor, whether the moving object climbs up the stairs, based on the sensed slope.

For example, step S620 of reducing the speed of the moving object in the specific section while the moving object climbs up or down the stairs, based on the sensed slope may include a step of determining, by the processor, a maximum slope in a section in which the moving object climbs up the stairs, based on the sensed slope.

For example, the step of determining, by the processor, the maximum slope in the section in which the moving object climbs up the stairs, based on the sensed slope may include a step of determining, by the processor, a slope at a point at which a continuous increase in the sensed slope ends, as the maximum slope.

For example, the step of determining, by the processor, the slope at the point at which the continuous increase in the sensed slope ends, as the maximum slope may include a step of determining, by the processor, the end of the continuous increase in the sensed slope when a slop sensed in a current cycle minus a slop sensed in a previous cycle is not greater than a preset threshold value.

For example, step S620 of reducing the speed of the moving object in the specific section while the moving object climbs up or down the stairs, based on the sensed slope may further include a step of determining, by the processor, whether the sensed slope is greater than the maximum slope minus a specific margin and a step of reducing, by the processor, the speed of the moving object in a section in which the sensed slope is greater than the maximum slope minus the specific margin.

For example, step S620 of reducing the speed of the moving object in the specific section while the moving object climbs up or down the stairs, based on the sensed slope may include a step of determining, by the processor, whether the sensed slope is greater than a preset threshold slope and a step of reducing, by the processor, the speed of the moving object in a section in which the sensed slope is greater than the preset threshold slope.

For example, step S620 of reducing the speed of the moving object in the specific section while the moving object climbs up or down the stairs, based on the sensed slope may further include a step of updating, by the processor, the maximum slope when a slope sensed while the moving object climbs up the stairs is greater than the maximum slope.

For example, step S620 of reducing the speed of the moving object in the specific section while the moving object climbs up or down the stairs, based on the sensed slope may include a step of determining, by the processor, whether the moving object climbs down the stairs, based on the sensed slope and a step of reducing, by the processor, the speed of the moving object when it is determined that the moving object climbs down the stairs.

For example, step S620 of reducing the speed of the moving object in the specific section while the moving object climbs up or down the stairs, based on the sensed slope may further include a step of consistently determining, by the processor, whether the moving object has finished climbing down the stairs, based on the slope when it is determined that the moving object climbs down the stairs and a step of increasing, by the processor, the speed of the moving object to an existing speed when it is determined that the moving object has finished climbing down the stairs.

Figure 7:
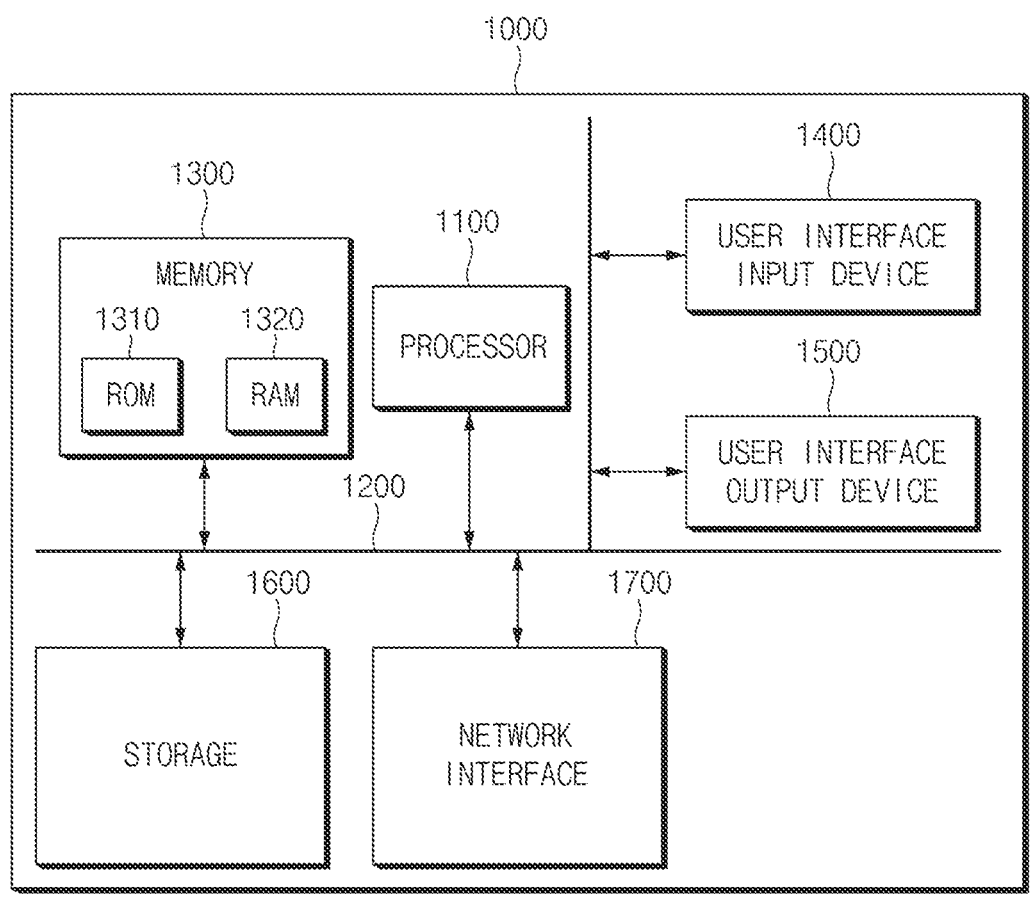
FIG. 7 illustrates a computing system according to an embodiment of the present disclosure.

FIG. 7 illustrates a computing system according to an embodiment of the present disclosure.

Referring to FIG. 7, the computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, or a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Effects of the moving-object driving control apparatus and method according to the present disclosure will be described below.

According to at least one of the embodiments of the present disclosure, the apparatus and method for controlling driving of the moving object climbing up or down the stairs may be provided.

According to at least one of the embodiments of the present disclosure, the moving-object driving control apparatus and method may improve driving safety of the moving object climbing up or down the stairs.

According to at least one of the embodiments of the present disclosure, the moving-object driving control apparatus and method may enable the moving object to overcome an atypical obstacle by using a simple algorithm without using an excessive computational resource.

According to at least one of the embodiments of the present disclosure, the moving-object driving control apparatus and method may apply an individually customized algorithm for driving stability depending on the shape of a stair on which the moving object travels at present in a process of climbing up the stairs.

According to at least one of the embodiments of the present disclosure, the moving-object driving control apparatus and method may minimize a reduction in driving stability and moving speed of the moving object and may improve autonomous driving stability of the moving object.

In addition, the present disclosure may provide various effects that are directly or indirectly recognized.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. An apparatus for controlling driving of a moving object, the apparatus comprising:
   a tilt sensor included in the moving object and configured to sense a slope of the moving object in a pitch direction; and
   a processor configured to reduce a speed of the moving object in a specific section while the moving object climbs up or down stairs, based on the sensed slope;
   wherein the processor is further configured to determine a maximum slope in a section in which the moving object climbs up the stairs, based on the sensed slope;
   wherein the processor is further configured to:
      determine whether the sensed slope is greater than the maximum slope minus a specific margin; and
      reduce the speed of the moving object in a section in which the sensed slope is greater than the maximum slope minus the specific margin.

2. The apparatus of claim 1, wherein the processor is further configured to determine whether the moving object climbs up the stairs, based on the sensed slope.

3. The apparatus of claim 1, wherein the processor is further configured to determine a slope at a point at which a continuous increase in the sensed slope ends, as the maximum slope.

4. The apparatus of claim 3, wherein the processor is further configured to determine that the continuous increase in the sensed slope ends, when a slope sensed in a current cycle minus a slope sensed in a previous cycle is not greater than a preset threshold value.

5. The apparatus of claim 1, wherein the processor is further configured to:
   determine whether the sensed slope is greater than a preset threshold slope; and
   reduce the speed of the moving object in a section in which the sensed slope is greater than the preset threshold slope.

6. The apparatus of claim 1, wherein the processor is further configured to update the maximum slope when the sensed slope is greater than the maximum slope while the moving object climbs up the stairs.

7. The apparatus of claim 1, wherein the processor is further configured to:
   determine whether the moving object climbs down the stairs, based on the slope; and
   reduce the speed of the moving object when it is determined that the moving object climbs down the stairs.

8. The apparatus of claim 7, wherein the processor is further configured to:
   consistently determine whether the moving object has finished climbing down the stairs, based on the slope when it is determined that the moving object climbs down the stairs; and
   increase the speed of the moving object to an existing speed when it is determined that the moving object has finished climbing down the stairs.

9. A method for controlling driving of a moving object, the method comprising:
   sensing, by a tilt sensor included in the moving object, a slope of the moving object in a pitch direction;
   reducing, by a processor, a speed of the moving object in a specific section while the moving object climbs up or down stairs, based on the sensed slope; and
   wherein reducing the speed of the moving object in the specific section while the moving object climbs up or down the stairs, based on the sensed slope comprises determining, by the processor, a maximum slope in a section in which the moving object climbs up the stairs, based on the sensed slope;
   wherein reducing the speed of the moving object in the specific section while the moving object climbs up or down the stairs, based on the sensed slope further comprises:
      determining, by the processor, whether the sensed slope is greater than the maximum slope minus a specific margin; and
      reducing, by the processor, the speed of the moving object in a section in which the sensed slope is greater than the maximum slope minus the specific margin.

10. The method of claim 9, wherein reducing the speed of the moving object in the specific section while the moving object climbs up or down the stairs, based on the sensed slope comprises:
   determining, by the processor, whether the moving object climbs up the stairs, based on the sensed slope.

11. The method of claim 9, wherein determining, the maximum slope in the section in which the moving object climbs up the stairs, based on the sensed slope comprises:
   determining, by the processor, a slope at a point at which a continuous increase in the sensed slope ends, as the maximum slope.

12. The method of claim 11, wherein determining the slope at the point at which the continuous increase in the sensed slope ends, as the maximum slope comprises:
   determining that the continuous increase in the sensed slope ends, when a slope sensed in a current cycle minus a slope sensed in a previous cycle is not greater than a preset threshold value.

13. The method of claim 9, wherein reducing the speed of the moving object in the specific section while the moving object climbs up or down the stairs, based on the sensed slope comprises:
   determining, by the processor, whether the sensed slope is greater than a preset threshold slope; and
   reducing, by the processor, the speed of the moving object in a section in which the sensed slope is greater than the preset threshold slope.

14. The method of claim 9, wherein reducing the speed of the moving object in the specific section while the moving object climbs up or down the stairs, based on the sensed slope further comprises:
   updating, by the processor, the maximum slope when the sensed slope is greater than the maximum slope while the moving object climbs up the stairs.

15. The method of claim 9, wherein reducing the speed of the moving object in the specific section while the moving object climbs up or down the stairs, based on the sensed slope comprises:
- determining, by the processor, whether the moving object climbs down the stairs, based on the slope; and
- reducing, by the processor, the speed of the moving object when it is determined that the moving object climbs down the stairs.

16. The method of claim 15, wherein reducing the speed of the moving object in the specific section while the moving object climbs up or down the stairs, based on the sensed slope further comprises:
- consistently determining, by the processor, whether the moving object has finished climbing down the stairs, based on the slope when it is determined that the moving object climbs down the stairs; and
- increasing, by the processor, the speed of the moving object to an existing speed when it is determined that the moving object has finished climbing down the stairs.

* * * * *